REPERTORY DIALING SYSTEM

Filed Oct. 12, 1959

GIUSEPPE ZANARDO
INVENTOR.

BY Karl G. Ross
AGENT

United States Patent Office 3,120,582

Patented Feb. 4, 1964

3,120,582
REPERTORY DIALING SYSTEM

Giuseppe Zanardo, Via Privata Pozzuoli 8, Milan, Italy

Filed Oct. 12, 1959, Ser. No. 845,917
Claims priority, application Italy Oct. 13, 1958
4 Claims. (Cl. 179—90)

This invention relates to a device which is suitable for recording on a magnetic storage means, such as a magnetic tape, the electric pulses which commonly are generated by the angular rotation of a conventional telephone dial as a consequence of the selection of the identifying number of a telephone subscriber and which is further suitable for reading the electric pulses thus recorded and for actuating therewith to the telephone network, so as to call the selected telephone subscriber corresponding to the pulses, without manual dialing operations.

Devices have been proposed heretofore for this purpose; these earlier devices primarily were based upon cams and the like, mounted on a shaft which was driven for instance by an electrical motor, so that upon starting of said motor, a given sequence of pulses were emitted by the contacts actuated by said cams, thus energizing the telephone network with the pulses necessary for calling a subscriber identified by said individual cams. Other devices have been proposed, wherein for each subscriber to be called, a correspondingly pre-set relay was energized, a key-board being associated with such devices in order to bring about a given setting of each relay. Furthermore, a device has been described, wherein a magnetic storage means, such as a drum, was associated with magnetic heads of a circuit fed by the electric pulses emitted by the dial during its repeated rotation, whereas magnetic reading heads and cancelling heads were provided, for reading such recorded pulses and transmitting them to the telephone network or for cancelling them, if the pulses corresponding to another subscriber had to be recorded. Many drawbacks affected such known devices: in the mechanical type, provided with cams, the pre-setting of the device for pulse sequences of given subscriber was difficult and involved the need for a plurality of cams, as was the replacing of a subscriber for another. Similar difficulties arose in the electromechanical kind of apparatus, where each relay had to be pre-set via a complicated operation.

In the device provided with a magnetic drum, an extremely complicated arrangement is necessary, involving a series of individual electrical and mechanical elements, and furthermore only a limited number of pulse sequences, each corresponding to a given subscriber, could be recorded on the magnetic drum.

It is accordingly an object of this invention to provide an apparatus, which is simple in operation, and permits the pulse sequences identifying a given subscriber to be readily recorded by simply operating the usual selection dial of a conventional telephone, and such recordal to be readily cancelled and replaced by other pulse sequences, if desired.

A further object of the invention is to provide a device of the class described, which is of simple manufacture, and which permits, although using reduced-sized magnetic storage means, a remarkable number of pulse sequences to be recorded, thus affording a useful apparatus for the automatic selection of a large number of subscribers, among those usually called by the user.

These and further objects are achieved according to the invention by a device comprising in combination a manually operable pulse forming means for selecting the number of dialing pulses to be emitted, an oscillator means for generating oscillator pulses having at least two different sonic frequencies, said oscillator being responsive to said dialing pulses, switching means for selecting one of said frequencies, a magnetic storage means for storing said oscillator pulses, reading, recording and cancelling head means in circuit with said oscillator for energizing said magnetic storage means, means for switching said recording, reading and cancelling means to bring about the recording, reading and cancelling operation respectively, and relay means operating electrical contacts, said relay means being connected to said reading head means when in the operative reading position and being electrically connected with the output of said oscillator, so as to be energized by the oscillator pulses read by said reading head means, said electrical contacts actuating the telephone network.

The invention will be now more particularly described with reference to a preferred embodiment thereof, which is illustrated in the accompanying drawing. In the drawing.

Figures 1, 2, 3, 4:
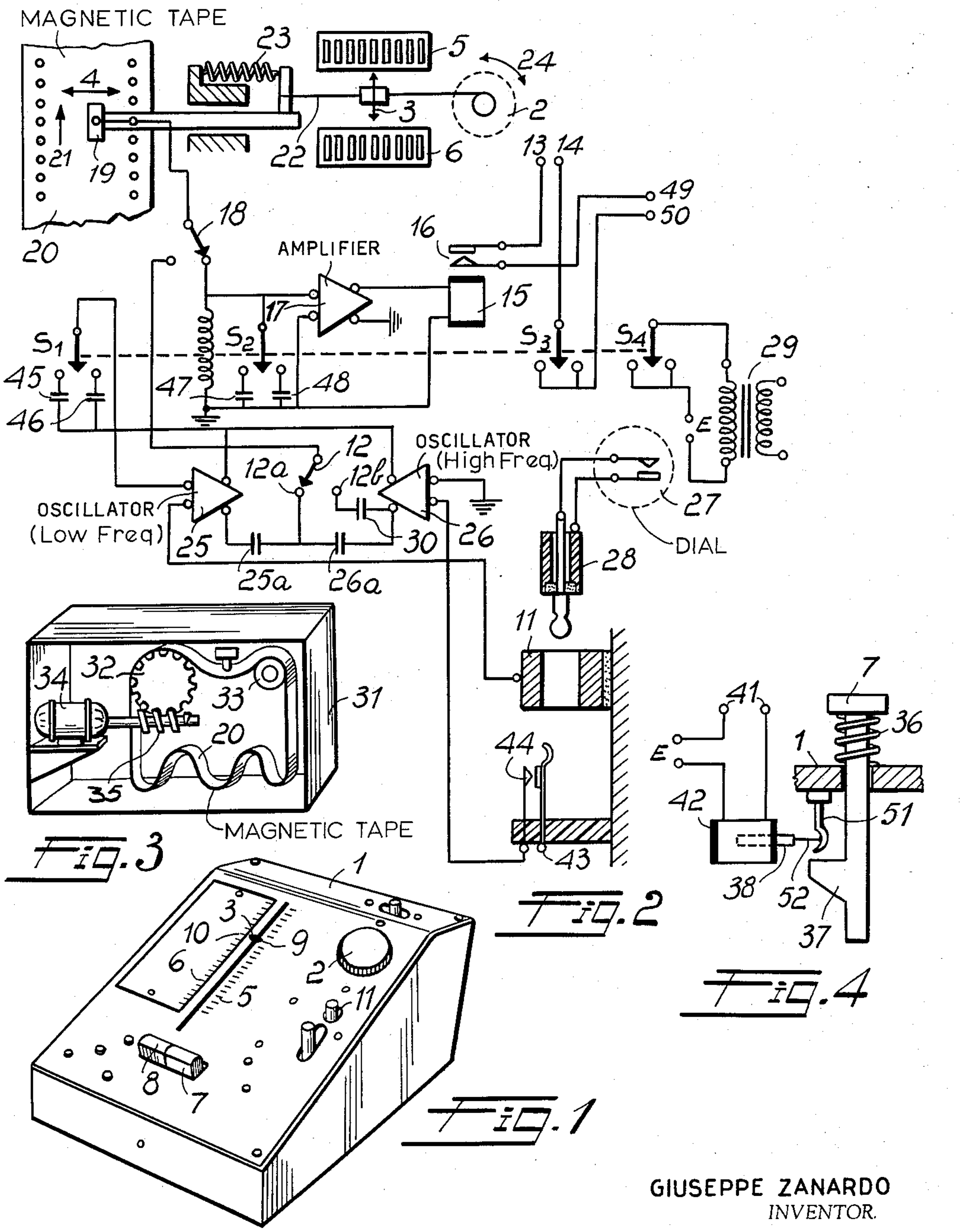
FIG. 1 is a perspective view of a cabinet enclosing the inventive circuitry, with actuation and controlling means accessible on the outer part of such cabinet.
FIG. 2 is an electrical diagram, with some of the related mechanical devices diagrammatically illustrated.
FIG. 3 is a diagrammatic side elevation of a case containing a magnetic tape forming a part of said cabinet.
FIG. 4 is a detail view of a starting push-button.

The inventive device comprises a cabinet 1, on the front cover whereof a rotatable handwheel or knot 2 is arranged, which, by means of a string 22 (FIG. 2) and upon its rotation in the direction of arrow 24, displaces an index 3, secured to said string, along the graduations 5 and 6 in the direction of the arrow 4. This displacement is resisted by a spring 23, which is secured with one end to a fixed part of the cabinet, and with the other end to the shaft or arm of a recording, reading and cancelling head 19, which is conventional in the art.

Near such graduations 5 and 6, the numbers or names corresponding to the telephone subscribers are conveniently marked. Selector keys 7 and 8 on the panel of the cabinet serve for respectively selecting the row 5 or the row 6 of numbers. If for instance the index 3 is brought in the position shown in FIG. 1, it is possible to select, either for recording or for reading, the number associated with the graduation 9 if key 7 is depressed, or the number associated with the mark 10, if the key 8 is depressed. A jack 11 on the cabinet board is provided to receive the plug 28 (FIG. 2), whereas a push button 12 is mounted on the panel to switch the circuit to its cancelling position.

Referring now more particularly to FIGS. 2, 3 and 4, it will be seen that the plug 28 is connected to the schematically illustrated contacts controlled by a conventional telephone dial 27, which contacts by their conventional intermittent opening, when dialing, will transmit a dialing pulse to the jack 11, the sleeve of which is connected, as is seen in FIG. 2, to the oscillator 25. Simultaneously contacts 44 are closed by the tip of plug 28, one of said contacts being connected at 43 to the positive terminal of an electric power source, whereas the other contact is connected to an oscillator 26, generating electric pulses having supersonic frequencies. The output of such oscillator 26 is connected to the input of said oscillator 25 through either of two capacitors 45 annd 46 and through the selector contacts $S_1$ of a four pole-double throw switch $S_1$—$S_2$—$S_3$—$S_4$. Furthermore, another output terminal 2*a* of oscillator 25 is connected to one terminal of the push-button switch 12 through a capacitor 25*a*, whereas the other terminal of the oscillator 26 is connected, via a respective capacitor 26*a*, to the same terminal of the switch 12. Thus, when the movable contact of this switch 12 is connected to this terminal 12*a*, and the record/erase switch 18 is shifted, from its position shown in the drawing, to the left-hand position, the magnetic head receives pulses having a carrier frequency derived from the oscillator 26, and an information frequency from the oscillator 25, which frequency may be chosen from among two fixed frequencies and selected by changing the switch $S_1$ from the branch connected to the capacitor 45 to that connected to the capacitor 46.

The oscillator 26 has its output further connected, through a capacitor 30 having a large capacitance, and the second position 12*b* of switch 12, across switch 18, to the head 19, being thus able also to feed this head with high frequency pulses to cancel any previous recording.

The head 19 is connected, through switch 18 when the latter is in right-hand or read position, to the amplifier 17, which is selectively tunable to the two frequencies of the pulses generated by the oscillator 25, by means of the switch contacts $S_2$, thereby connecting one of the capacitors 47 and 48 of the capacitive branch of a filter network in circuit, the induction branch being common to both capacitors as shown. The amplifier 17 in turn has its output connected to the winding of the relay means 15, which, when energized, opens the contact 16, according to the pulses read by the head 19, thus transmitting selector pulses to the network 13—14 which is conventionally connected to a selection station of a telephone exchange, as is known in the art. The switch contacts $S_3$, in both operative positions, is capable of shunting the dial of the conventional telephone apparatus, which is connected to the terminals 49 and 50.

The last section $S_4$ of the two positions switch is capable of connecting in either of the operative position, the A.C. source E to an auto-transformer 29.

With reference to FIG.4, one of the push buttons 7 and 8 and namely the switch button 8 is shown with greater detail, said push buttons 7 and 8 performing, as has been stated, the commutation or changeover, when selectively depressed, of the switch $S_1$—$S_2$—$S_3$—$S_4$ from one operative position to the other depressed position, bringing the switch into a neutral position wherein none of its contacts are closed. Depression of push button 7 or 8 is resisted by a spring 36 wound on the shaft of said push button and abutting against a stationary portion of the cabinet 1. During depression of the push button, a tooth 37 on the shaft thereof deflects an elastic member 51, which after its free end has been passed by said tooth, acts as a stop means. This free end is however connected through a string 52 to the movable armature 38 of a relay 42, the winding of which is connected to the electrical energy source E by means of the contacts 41, which are energized by means of the tape, at the end of its convolution. The means for actuating the contacts 41 are conventional in the art, and may be formed by a projection carried by the tape, or by a hole in the tape, which permits the contacts 41, if assumed to be permanently used one against the other but separated by the insulating material of the tape passing therebetween to provide an electric connection between them.

Referring now more particularly to FIG. 3, it may be observed that the magnetic tape 20 is arranged in a case 31, said tape being guided by a roller 33 and driven by a toothed roller 32, which is secured to a helical gear, in mesh with the worm 35, driven by the electric motor 34. The toothed roller 32 may engage peripheral holes of the tape 20, driving it in the direction of arrow 21 (FIG. 2).

Operation of the device is as follows.

*Recording*

The plug 28 is introduced into the jack 11. Thus, contacts 44 are closed, and oscillator 26 is connected to the anodic current, from the terminal 43. The switch 18 is then changed over from the position shown in the drawing to its left-hand position. The handwheel 2 is now rotated until the index 3 reaches a position or track on the tape, which is available for recording. Now switch $S_1$ is shifted to one of the selected frequencies of the pulses generated by the oscillator 25. The actuation of switch $S_1$ occurs, as already stated, by the depression of one of the keys 7 and 8. Now, by the rotataion of the conventional dial 27, the contacts operated by this dial will open and close successively, thus transmitting selector pulses of anodic current to oscillator 25, which will generate in turn oscillator pulses having sonic frequencies and added to the carrier frequency of the oscillator 26. Such oscillator pulses will be recorded by head 19 on the tape. Obviously, upon depression of one of the keys 7 and 8, the electric motor 34 is energized (via contacts $S_4$, the transformer 29 being connected to motor 34), and the tape is driven. At the end of its convolution, the contacts 41 are closed in the disclosed manner, and key 7 (or 8) returns to its starting position ("off" position). Depressing now the other key, for instance key 8, it is possible to record on the same track, but with a different frequency, the oscillator pulses generated in response to the dialing pulses corresponding to the number of another telephone subscriber.

*Automatic Selection of a Subscriber*

In order to select one of the subscribers marked on the scale 5, the wheel 2 is rotated until index 3 reaches the specific mark. Then, one of the keys 7 or 8 is depressed, as the case may be. The plug 28 has previously been removed from hole 11 and the switch 18 displaced to its position shown in the drawing. Consequently, the head 19 reads the recorded pulses and transmits them to the amplifier 17.

The amplifier in turn transmits suitable pulses to the winding of relay 15, thus causing the contacts 16 to successively close and open, as it would have occurred if the usual contacts would have been closed by dial 27. The pulses thus formed are transmitted through the lines 13 and 14 to a conventional telephone selection station.

*Cancelling of a Subscriber*

In order to cancel a subscriber, it is sufficient to shift switch 12 from the contacts 12*a* to the contact 12*b* and to depress one of the keys 7 or 8, to start the motor 34.

It will be readily understood that, although oscillator 25 has been considered as in a position to generate pulses having only two distinct frequencies, the number of such frequencies may be further increased. Inclusion of a further corresponding series of keys, similar to keys 7 or 8, and of capacitors, similar to capacitors 45—46 and 47—48 will then be necessary.

I claim:

1. In a repertory dialing system, in combination, a housing, magnetic storage means within said housing, a pick-up and recording head disposed adjacent said magnetic storage means for scanning the latter, oscillator means having at least two output frequencies operatively connectable to said head, manually operable pulse-forming means for energizing said oscillator means, thereby recording a train of pulses on said storage means, amplifier means operatively connectable with said head for receiving pulses picked up thereby, relay means energized by said amplifier means for interrupting a telephone circuit, thereby dialing a telephone number corresponding to said train of pulses, and switch means in circuit with said oscillator means and said head for selectively applying pulses of one of said frequencies thereto, said amplifier means being provided with a filter circuit connected to said head, said filter circuit including an inductive branch and a capacitive branch comprising a plurality of capacitors, said switch means having contacts for selectively connecting any of said capacitors in circuit with said inductive branch, thereby tuning said filter circuit to said one of said frequencies.

2. The combination according to claim 1 wherein said oscillator means is provided with a plurality of frequency-determining capacitors, said switch means having further contacts operable to connect any one of said capacitors in circuit with said head.

3. The combination according to claim 1 wherein said switch means includes an actuating member for each of said frequencies extending outwardly of said housing, said contacts being within said housing for operation by said members, locking means yieldably engaging said members in the actuated positions thereof, and electromechanical release means triggered by said storage means for disengaging said locking means.

4. The combination according to claim 1 wherein said pulse-forming means comprises a source of electric current and a telephone-dial switch connected in series with said source.

References Cited in the file of this patent

UNITED STATES PATENTS

| | | |
|---|---|---|
| 2,701,279 | Lovell et al. | Feb. 1, 1955 |
| 2,760,005 | Williamson et al. | Aug. 21, 1956 |
| 2,827,515 | Zuber | Mar. 18, 1958 |
| 2,941,043 | Ham | June 14, 1960 |
| 3,040,133 | Kobler | June 19, 1962 |
| 3,055,986 | Hjertstrand | Sept. 25, 1962 |

FOREIGN PATENTS

| | | |
|---|---|---|
| 860,794 | Great Britain | Feb. 8, 1961 |